United States Patent [19]

Klingler

[11] 4,040,724
[45] Aug. 9, 1977

[54] MAGNIFYING DISPLAY ARTICLE

[76] Inventor: Josef F. Klingler, 1335 Gregory, Wilmette, Ill. 60091

[21] Appl. No.: 607,029

[22] Filed: Aug. 22, 1975

[51] Int. Cl.² .............................................. G02B 27/02
[52] U.S. Cl. ...................................... 350/239; 40/358
[58] Field of Search ............... 350/239, 243, 245, 247, 350/252; 16/1; 206/.8, .81, .82; 40/358

[56] References Cited

U.S. PATENT DOCUMENTS

| | | | |
|---|---|---|---|
| 736,751 | 8/1903 | Lobmiller | 40/358 |
| 2,427,870 | 9/1947 | Mitchell | 350/239 X |
| 3,139,977 | 7/1964 | Burdick | 350/239 X |
| 3,312,197 | 4/1967 | Smith | 40/358 |
| 3,410,634 | 11/1968 | Buckner | 350/239 |

Primary Examiner—F. L. Evans
Attorney, Agent, or Firm—Wegner, Stellman, McCord, Wiles & Wood

[57] ABSTRACT

A magnifying display article, such as a paperweight, having a transparent cover portion defining a magnifying lens, and a base having a mounting portion and a centering structure for centering the mounting portion below the lens. The base is sealed to the cover outwardly of the mounting portion, and in the illustrated embodiment, the centering structure defines a first seal and adhesive sealant defines a second seal. The mounting portion of the base is defined by a pedestal which supports the display to be observed through the magnifying lens in an in-focus disposition.

13 Claims, 3 Drawing Figures

MAGNIFYING DISPLAY ARTICLE

BACKGROUND OF THE INVENTION

1. Field of the Invention

This invention relates to display articles and in particular to dsplay articles having an integral magnifying lens for improved observation of a display therein.

2. Description of the Prior Art

In one form of magnifying paperweight, a glass cover portion is provided in the form of a lens. A display to be observed through the lens is secured to the underside of the cover portion and the bottom of the cover portion is covered with a suitable material, such as felt, paper, etc., to complete the assembly. The felt may be stretched across the recess receiving the display article.

In one form, the paper is pressed into the recess and the bottom of the recess is left open.

SUMMARY OF THE INVENTION

The present invention comprehends an improved magnifying display article wherein the display may comprise a representation of a device, such as a coin, carried on a pedestal portion of a molded synthetic resin base.

The base and overlying transparent cover define co-operating centering means for locating the pedestal in centered relationship to a magnifying lens portion of the cover.

The pedestal and magnifying lens are preselected so as to effectively cause the display to be positioned accurately in an in-focus position underlying the lens.

The portion of the base surrounding the pedestal is preselected to be in an out-of-focus disposition relative to the lens to provide an improved magnified presentation of the device.

The base may be provided with a rounded periphery to define a mar-proof support for the article such as on fine furniture surfaces, and the like.

The centering means may comprise an annular upstanding flange on the base engaging a downturned peripheral portion of the cover in coaxially centered relationship.

The centering means flange may have sealed engagement with the cover portion. Additionally, adhesive sealant may be provided between the flange and cover outwardly of the flange for further improved sealing and securing of the base to the cover. The base may be provided with an annular recess surrounding the flange for receiving a portion of the adhesive sealant for improved sealed securing of the base to the cover.

The periphery of the base may project downwardly so as to space the center portion thereof upwardly from the bottom plane of the article. The pedestal may be provided on the mid-portion of the base and, thus, is effectively prevented from vertical displacement in the normal supporting arrangement of the article on a subjacent planar surface, thereby maintaining the disposition of the device carried on the pedestal accurately in the in-focus position.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
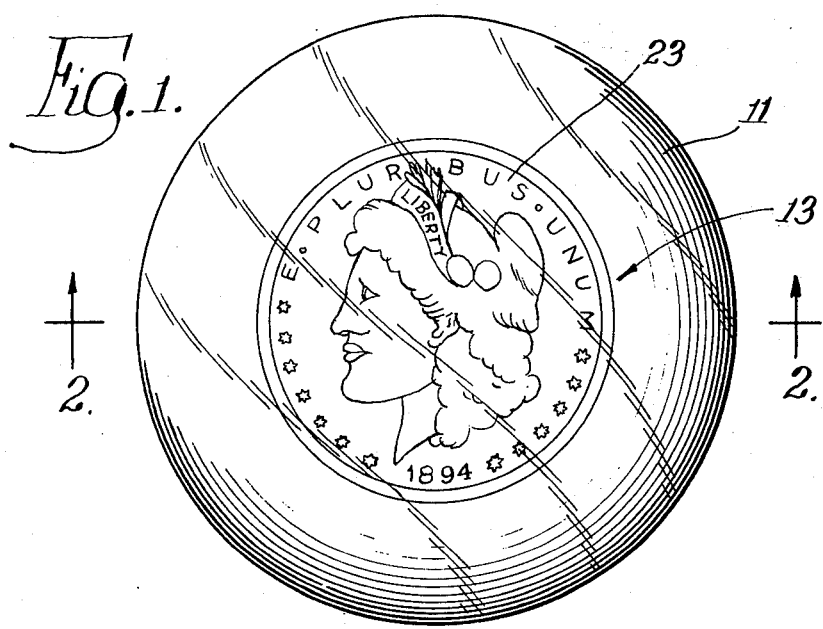
FIG. 1 is a top plan view of a magnifying display article embodying the invention.

In the exemplary embodiment of the invention as disclosed in the drawing, a magnifying display article generally designated 10 illustratively comprises a paperweight having a transparent cover 11 and a base 12. Base 12 may be molded of a suitable synthetic resin, such as polypropylene, to define a scratchproof, mar-proof support for the paperweight such as on fine finished furniture surfaces.

The cover may be formed of a suitable transparent material, such as synthetic resin, glass, etc., and defines a central lens portion 13 and an annular peripheral edge portion 14. Lens 13 is defined by an outer convex, outwardly projecting surface 15 and an inner convex, inwardly projecting surface 16 at the center of the cover. The peripheral portion 14 defines a lowermost support surface 17.

Base 12 effectively defines a disclike element having a center portion 18 and an annular peripheral portion 19. Center portion 18 may be defined by a substantially planar bottom surface 20 and peripheral portion 19 may be defined by a downwardly projecting annular surface 21 for supporting the base and entire article 10 on a subjacent planar surface S. The softness of the plastic base effectively causes the supporting surface 21 to be mar-proof and scratchproof notwithstanding the placement of the article on a surface S having a fine furniture finish, or the like.

Figure 2:
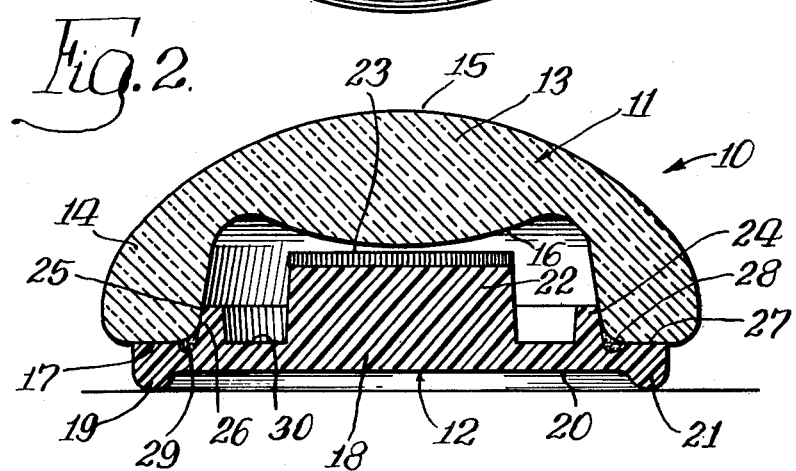
FIG. 2 is a diametric section thereof taken substantially along the line 2—2 of FIG. 1.
Figure 3:
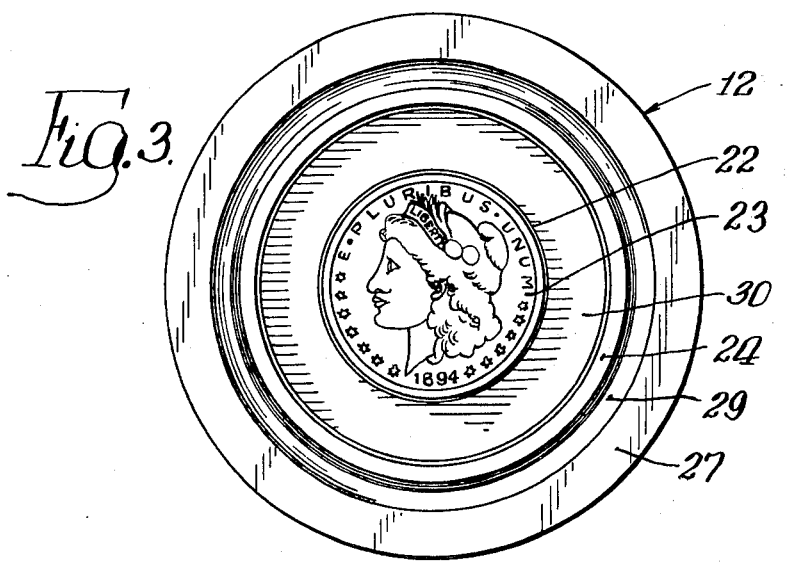
FIG. 3 is a plan view thereof with the magnifying cover removed.

Base 12 further defines a mounting portion 22 for carrying a device 23 to be displayed. In the illustrated embodiment, the mounting portion defines an upstanding cylindrical pedestal at the center of the base midportion 18. Spaced radially outwardly from the pedestal, the base is provided with an upstanding centering flange 24. Flange 24 defines an outer surface 25 sealingly engaging an inner surface 26 on the cover peripheral portion 14 for sealingly retaining the base 12 in centered association with the cover. As best seen in FIG. 2, the peripheral portion surface 26 effectively defines a downwardly opening recess in the underside of cover 11 centrally receiving the pedestal 22 and device 23. The abutment of cover surface 17 with the upper surface 27 of the base portion 19 limits the projection of the flange 24 into recess 26 with the base being firmly mechanically retained by the engagement of flange 24 with the cover surface 26.

To provide a further positive retention of the base to the cover, an adhesive sealant 28 may be provided outwardly of flange 24 and inwardly of surface 27. The base may be provided with an upwardly opening annular recess 29 inwardly of surface 27 and outwardly of flange 24 for receiving a portion of the adhesive 28. Illustratively, the adhesive may comprise an RTV adhesive sealant.

The flange 24 and surface 27 of base 12 cooperatively define positioning means for the device 23 relative to the lens 13 of the cover such that when the device 23 is mounted to the upper surface of the pedestal with the base installed in the cover, as shown in FIG. 2, the device will be positioned for in-focus observation through the lens. The annular surface 30 surrounding the pedestal, being effectively recessed relative to the device 23, is disposed in an out-of-focus relationship to the lens and, thus, an improved presentation of the device 23 is effected. Surface 30 may be suitably colored for further enhancement of the presentation of the device, as desired.

In the illustrated embodiment, device 23 comprises a representation of a coin and pedestal 22 may be preselectedto have a diameter substantially equal to the diameter of the coin representation for further improved display thereof. The device 23 may comprise a transparent plastic device having an undersurface defining a three-dimensional representation of the simulated coin and coated with a suitable metal to provide a close simulation of an actual coin. thus, the sealing of the base to the cover further protects the device 23 against deterioration of the metal surface, which may be extremely thin, for minimum cost of the article 10.

Surface 20 of the base is effectively spaced above the support surface S when the surface 21 of the base rests on surface S, thereby effectively preventing displacement of the pedestal 22 and device 23 carried thereon so as to maintain the device accurately in the in-focus position relative to lens 13. Surface 20 further defines a surface on which suitable indicia may be placed, such as advertising indicia, or the like.

Thus, article 10 is extremely simple and economical of construction while yet providing improved magnifying display means. The appearance of article 10 may be highly aesthetic and the facilitated installation of the base relative to the cover permits low cost manufacture of such articles with different displayed devices not readily permitted in display paperweights and the like of the prior art.

The foregoing disclosure of specific embodiments is illustrative of the broad inventive concepts comprehended by the invention.

I claim :

1. An article of manufacture comprising: a transparent cover defining a magnifying lens having a central vertical axis; a base having an upstanding mounting portion, an annular framing portion circumscribing said mounting portion and centering means engaging said cover for coaxially centering the mounting portion below said lens in fixed association therewith; and a display carried by and substantially fully covering said mounting portion for in-focus observation of the display through said lens, said framing portion immediately surrounding the display and being spaced below said display sufficiently to be out of focus.

2. The article of manufacture of claim 1 wherein said centering means comprises upstanding flange means comprising a portion of said framing portion.

3. The article of manufacture of claim 1 wherein said base further defines depending article support means.

4. The article of manufacture of claim 1 wherein said article comprises a paperweight.

5. The article of manufacture of claim 1 wherein said display comprises a representation of a coin.

6. The article of manufacture of claim 1 wherein said mounting portion comprises a pedestal and said display comprises a circular display having a diameter substantially equal to the diameter of the top of the pedestal.

7. The article of manufacture of claim 1 wherein said base defines an outer annular portion including a upright surface and a planar bottom surface, and said cover defines a complementary outer annular portion seated on each of said surfaces.

8. The article of manufacture of claim 1 wherein said lens is defined by a convex outwardly extending outer surface of the cover and a convex inwardly extending innner surface of the cover overlying said mounting portion.

9. The article of manufacture of claim 1 wherein said base is formed of synthetic resin.

10. An article of manufacture comprising: a transparent cover defining a magnifying lens having a central vertical axis; a base having an upstanding mounting portion, an annular framing portion circumscribing said mounting portion, and centering means engaging said cover for coaxially centering the mounting portion below said lens in fixed association therewith; and a display carried by said mounting portion for in-focus observation of the display through said lens, said framing portion being spaced below said display sufficiently to be out of focus, said centering means comprising an annular upstanding flange having a height substantially less than that of said mounting portion.

11. An article of manufacture comprising: a transparent cover defining a magnifying lens having a central vertical axis; a base having an upstanding mounting portion, an annular framing portion circumscribing said mounting portion, and centering means engaging said cover for coaxially centering the mounting portion below said lens in fixed association therewith; and a display carried by said mounting portion for in-focus observation of the display through said lens, said framing portion being spaced below said display sufficiently to be out of focus, said base defining an annular recess subjacent the periphery of said cover provided with a sealing adhesive means.

12. An article of manufacture comprising: a transparent cover defining a magnifying lens having a central vertical axis; a base having an upstanding mounting portion, an annular framing portion circumscribing said mounting portion, and centering means engaging said cover for coaxially centering the mounting portion below said lens in fixed association therewith; and a display carried by said mounting portion for in-focus observation of the display through said lens, said framing portion being spaced below said display sufficiently to be out of focus, the periphery of said cover defining a depending annular flange and said centering means comprising an upstanding annular flange on the base adapted to fit snugly into said cover in sealed engagement with said periphery, and sealing material being provided outwardly of said centering means flange for sealing the cover to the base.

13. The article of manufacture of claim 12 wherein the sealing material comprises adhesive means for securing said flange in said sealed engagment with said cover periphery.

* * * * *